United States Patent

Saarem

[11] Patent Number: 5,945,591
[45] Date of Patent: Aug. 31, 1999

[54] DIGITAL DIFFERENTIAL PRESSURE GAGE AND FLOW METER IMPLEMENTING SIGNAL DIFFERENCE PROCESSOR

[76] Inventor: Myrl J. Saarem, 2057 W. Washington St., Carson City, Nev. 89703-5420

[21] Appl. No.: 08/898,106

[22] Filed: Jul. 22, 1997

Related U.S. Application Data

[63] Continuation-in-part of application No. 08/609,540, Jun. 4, 1996, abandoned.

[51] Int. Cl.$^6$ ..................................................... G01F 25/00
[52] U.S. Cl. ............................... 73/1.35; 73/431; 73/717; 73/753; 73/756
[58] Field of Search ............................. 73/37, 273, 431, 73/756, 168, 714, 753, 754, 1.35, 717, 727, 718, 719, 720, 721

[56] References Cited

U.S. PATENT DOCUMENTS

| | | | |
|---|---|---|---|
| 3,550,426 | 12/1970 | Griffo | 73/3 |
| 3,711,689 | 1/1973 | Park | 73/3 X |
| 4,287,501 | 9/1981 | Tominaga et al. | 73/720 X |
| 4,850,228 | 7/1989 | Iizumi | 73/431 X |
| 4,949,288 | 8/1990 | Bookout | 73/168 X |

*Primary Examiner*—Joseph L. Felber
*Attorney, Agent, or Firm*—Keith Beecher; Richard D. Slehofer

[57] ABSTRACT

A solid state electronic digital pressure gage which is responsive to the inlet pressure (P1) and the outlet pressure (P2) of a device undergoing a flow test to measure the pressure differential across the device at different flow rates. The pressure gage includes a housing, a face plate mounted on the housing, and a printed circuit board may be mounted on the back of the face plate on which various electronic circuitry, components and controls are mounted. Certain of the controls may be adjustable from the front of the face plate. A pair of solid state pressure transducers is mounted on the housing, and these transducers generate electric signals which are a function of the pressures applied to the transducers. The transducers are connected to an electronic signal difference determining circuit which is included in the electronic circuitry, and the difference determining circuit generates a signal representing the difference between the pressures applied to the two transducers. The latter signal and the signals from the transducers are digitized and applied to a liquid crystal display device mounted on the face plate.

12 Claims, 6 Drawing Sheets

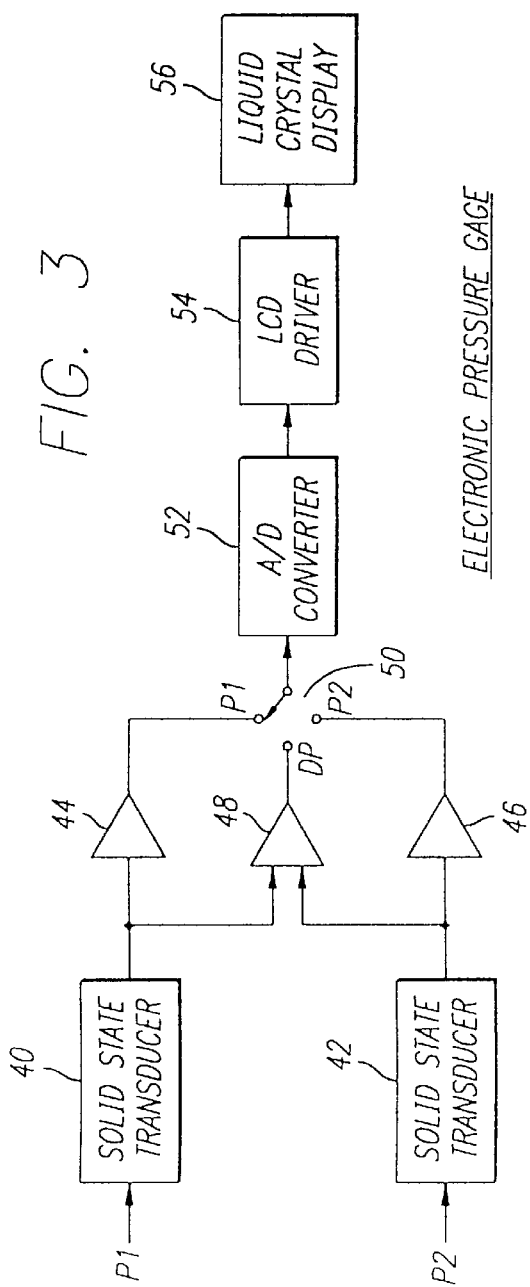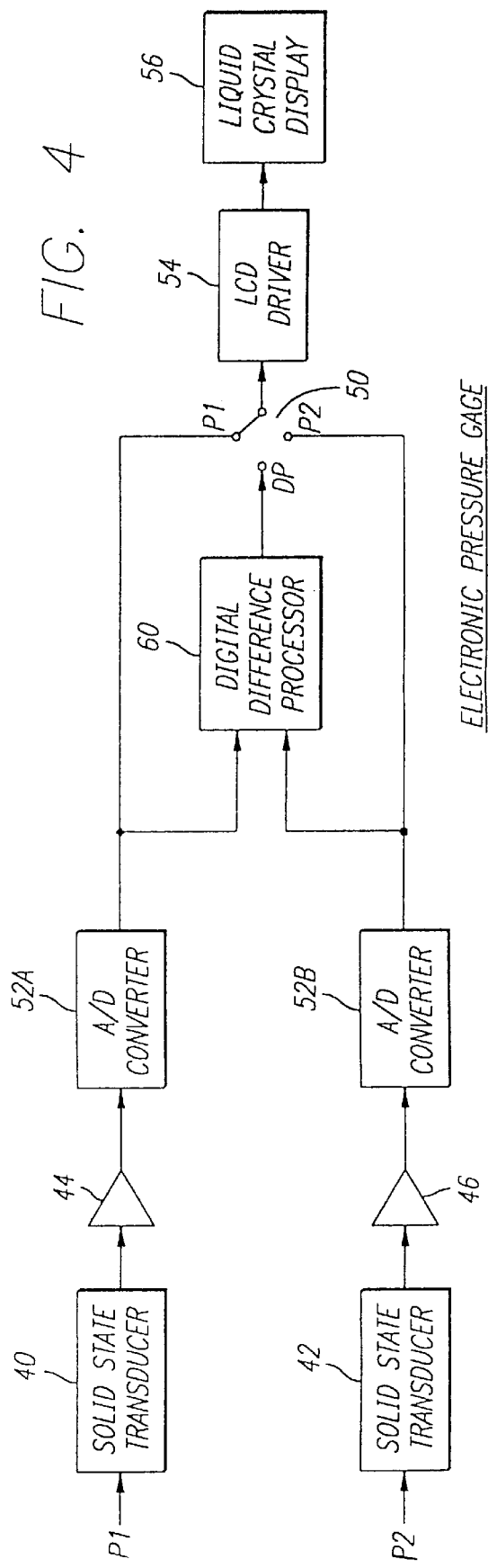

DIGITAL DIFFERENTIAL PRESSURE GAGE AND FLOW METER IMPLEMENTING SIGNAL DIFFERENCE PROCESSOR

This application is a continuation-in-part of abandoned application Ser. No. 08/609,540, filed Mar. 1, 1996, in the name of the present inventor.

BACKGROUND OF THE INVENTION

The present invention is concerned with an electronic solid state digital differential pressure gage system for directly displaying the pressure loss across a particular component at different flow rates; or to determine the pressure rise in a system caused by a pump. The invention is also concerned with an electronic solid state digital flow meter.

The pressure gage system of the invention finds particular utility during the development and manufacture of hydraulic components, such as valves, couplings, fittings, pressure regulators, flow regulators, pumps and the like. The system of the invention is used to measure the fluid flow versus pressure drop characteristics of such components at different flow rates in order to determine whether the particular component meets required performance standards and also to supply the user with necessary data for the design of the system.

The prior art systems for measuring pressure loss across a particular component at different flow rates usually includes Bourdon tube gages and mercury manometers. However, such prior art measuring systems are bulky and relatively inaccurate. Data collection in such prior art systems requires the operator to move from instrument to instrument to acquire data for each flow setting. Moreover, Bourdon tube gages are prone to vibration and often require damping. In addition, mercury manometers have a tendency to oscillate. Also, the readings from the gages and manometer generally require conversion to more convenient units.

The prior art systems are also subject to additional drawbacks. For example, the Bourdon tube gage requires interpolation of the gage marks; and the mercury manometer requires reading the cusp of a meniscus which many times is too dirty to accurately delineate. Some digital turbine flow meters require long waiting periods for the turbine speed to stabilize before readings can be taken. Venturi flow meters that use mercury manometers to read die pressure difference face the same problems discussed above.

An important element in the system of the invention is the pressure transducer which, for example, may be a silicon micro-machined solid state device that may be mounted on a printed circuit board. The system of the invention in the embodiment to be described incorporates a solid state pressure meter with a liquid crystal display device which is similar in some respects to the pressure meter described in U.S. Pat. No. 4,850,228.

Accordingly, an objective of the present invention is to provide a relatively inexpensive solid state digital pressure gage system which is easy to operate and which overcomes the problems inherent in the prior art systems.

The system of the invention is one in which the pressure drops of the various components being measured are directly displayed, for example, on the liquid crystal display device in any desired measurement unit.

BRIEF DESCRIPTION OF THE DRAWINGS

FIG. 3 is a block diagram of a solid state system incorporating the teachings of the present invention in one of its embodiments;

FIG. 4 is a block diagram of a solid state system incorporating the teachings of the invention in a second embodiment which is preferred over the embodiment of FIG. 3;

DETAILED DESCRIPTION OF THE ILLUSTRATED EMBODIMENTS

Figure 1:
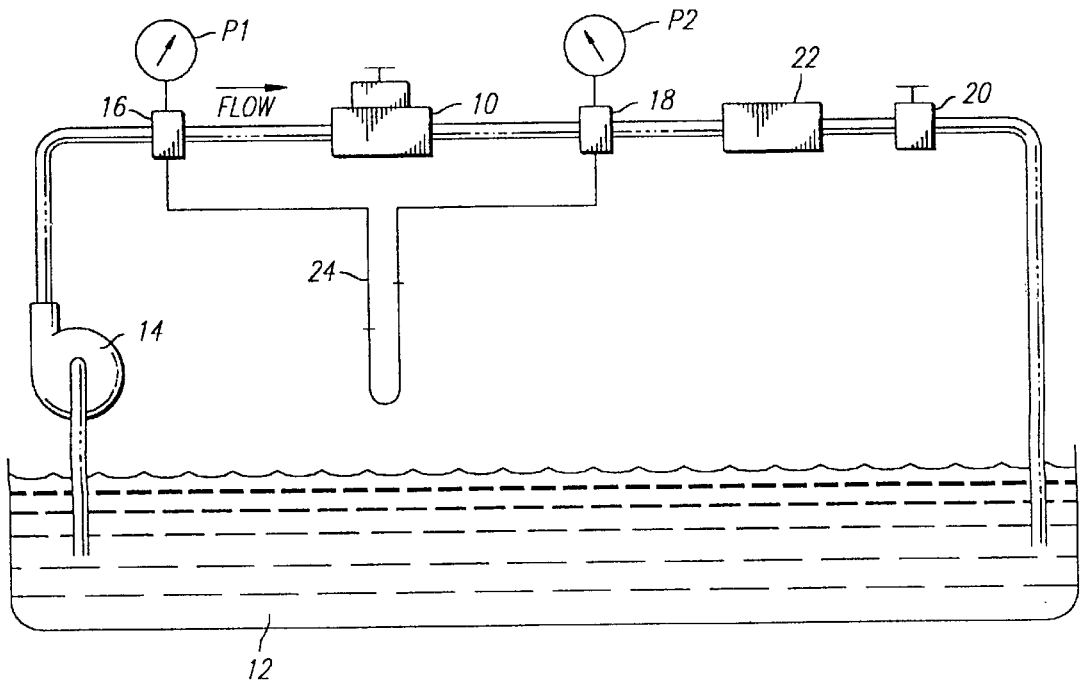
FIG. 1 is a schematic diagram of a typical prior art test loop for determining the pressure loss of a particular component at different flow rates.

As stated above, FIG. 1 is a schematic diagram of a typical prior art test setup which is used to determine the pressure loss at different flow rates through a particular component designated 10. In the system of FIG. 1, a liquid from a reservoir 12 is pumped through component 10 by a pump 14. The upstream pressure (P1) of the liquid flowing through component 10 is measured by a pressure gage 16 and the downstream pressure (P2) is measured by a pressure gage 18. The flow rate of the liquid through component 10 is controlled by a throttle valve 20. The flow rate is measured by a flow meter 22.

The pressure differential across the component is measured in the prior art system, for example, by a mercury manometer 24. The pressure gages 16 and 18 in the prior art system are typically Bourdon tube gages. The flow meter 22 may typically be turbine meter, a Venturi pressure-differential meter, a roto meter, a time/catch weight meter, an orifice meter, or the like.

Figure 2:
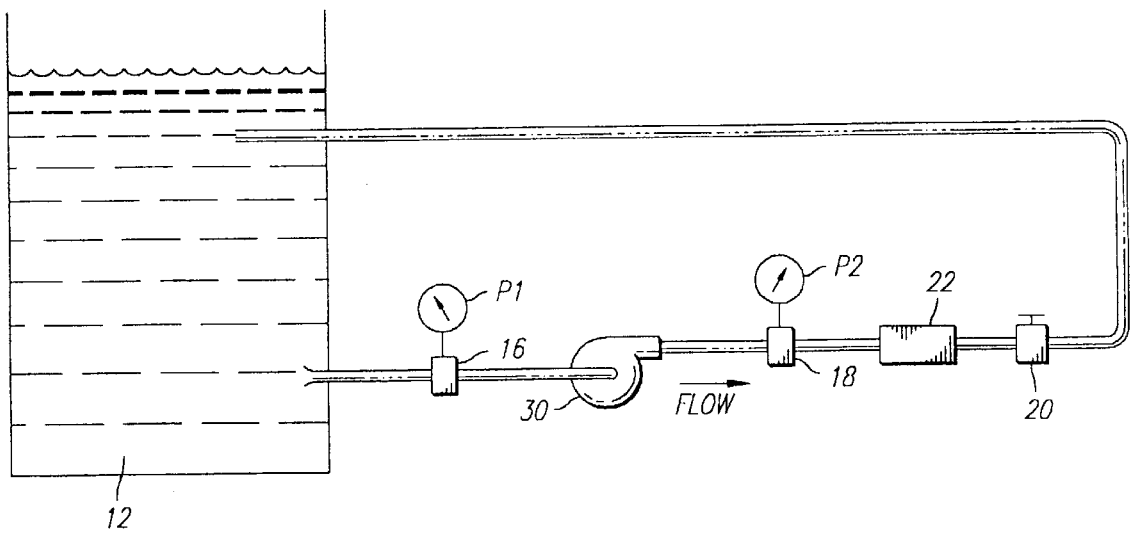
FIG. 2 is a schematic diagram of a typical prior art test loop similar to that of FIG. 1 but used to determine the pressure rise in a system due to a pump.

The prior art system of FIG. 2 is similar to the system of FIG. 1, and like components have been designated by the same numbers. The system of FIG. 2 is used to determine the pressure rise caused by a pump 30 which constitutes the test component.

As stated above, the prior art systems of FIGS. 1 and 2 have certain drawbacks in that measurements require the operator to move from instrument to instrument for each of the flow settings, and the instruments themselves are subject to certain drawbacks. The electronic solid state system of the present invention is intended to overcome the problems and drawbacks inherent in the prior art systems of FIGS. 1 and 2.

FIG. 3 is a block diagram of one embodiment of the solid state electronic system of the invention. Included in the system of FIG. 3 are a pair of pressure transducers 40, 42 each of which, as stated above, is a solid state instrument similar to the pressure meter described in U.S. Pat. No. 4,850,228, and preferably, a silicon micro-machined solid state device.

As shown in the block diagram of FIG. 3, the upstream pressure (P1) of component 10 of FIG. 1 is measured by solid state transducer 40, and the downstream pressure (P2) is measured by solid state transducer 42. The solid state transducer 40 generates an electric signal which is a measure of the upstream pressure (P1), and this signal is applied to an amplifier 44. The solid state transducer 42 produces a signal which is a function of the downstream pressure (P2), and the latter signal is applied to an amplifier 46. The output signal from transducer 40 is also introduced to one input of a differential amplifier 48, and the output signal of transducer 42 is also applied to a second input terminal of differential amplifier 48. Amplifiers 44, 46 and 48 are well known to the art, and any appropriate commercially available amplifier may be used.

The analog outputs from amplifiers 44, 46 and 48 are applied through a rotary switch 50 to an analog/digital converter 52 which, likewise, may be of any appropriate commercially available type. The analog/digital converter 52 serves to convert the analog signals from the amplifiers into corresponding digital signals which, in turn, are applied to a conventional liquid crystal display driver circuit 54. The driver circuit causes appropriate displays to appear on a liquid crystal display device 56. These displays are representative of the pressures (P1), (P2) and (DP=P1-P2). The displays may be caused to appear on the liquid crystal display in any appropriate selected measuring units by appropriately calibrating the display.

A presently preferred embodiment of the solid state electronic system is shown in FIG. 4, which incorporates many of the elements of the system of FIG. 3, and which are referred to in FIG. 4 with the same numbers. In the embodiment of FIG. 4, separate analog-digital converters 52A, 52B are connected to the respective outputs of amplifiers 44 and 46, and an electronic digital difference processor 60 of any suitable known and commercially available type is connected to the respective outputs of converters 52A and 52B. The digital difference processor 60 replaces the differential amplifier 48 of FIG. 3. All the remaining elements in the system of FIG. 4 are the same as those in the system of FIG. 3.

The use of the analog differential amplifier in the system of FIG. 3 to determine the difference between the pressures P1 and P2 can lead to the need for complicated zeroing and gain matching circuitry. The system of FIG. 4 utilizes processor 60 to determine the difference between the pressure signals after they have been digitized. In this manner the displayed difference pressure (DP) will always agree exactly with the difference between the pressures P1 and P2.

Figure 5:
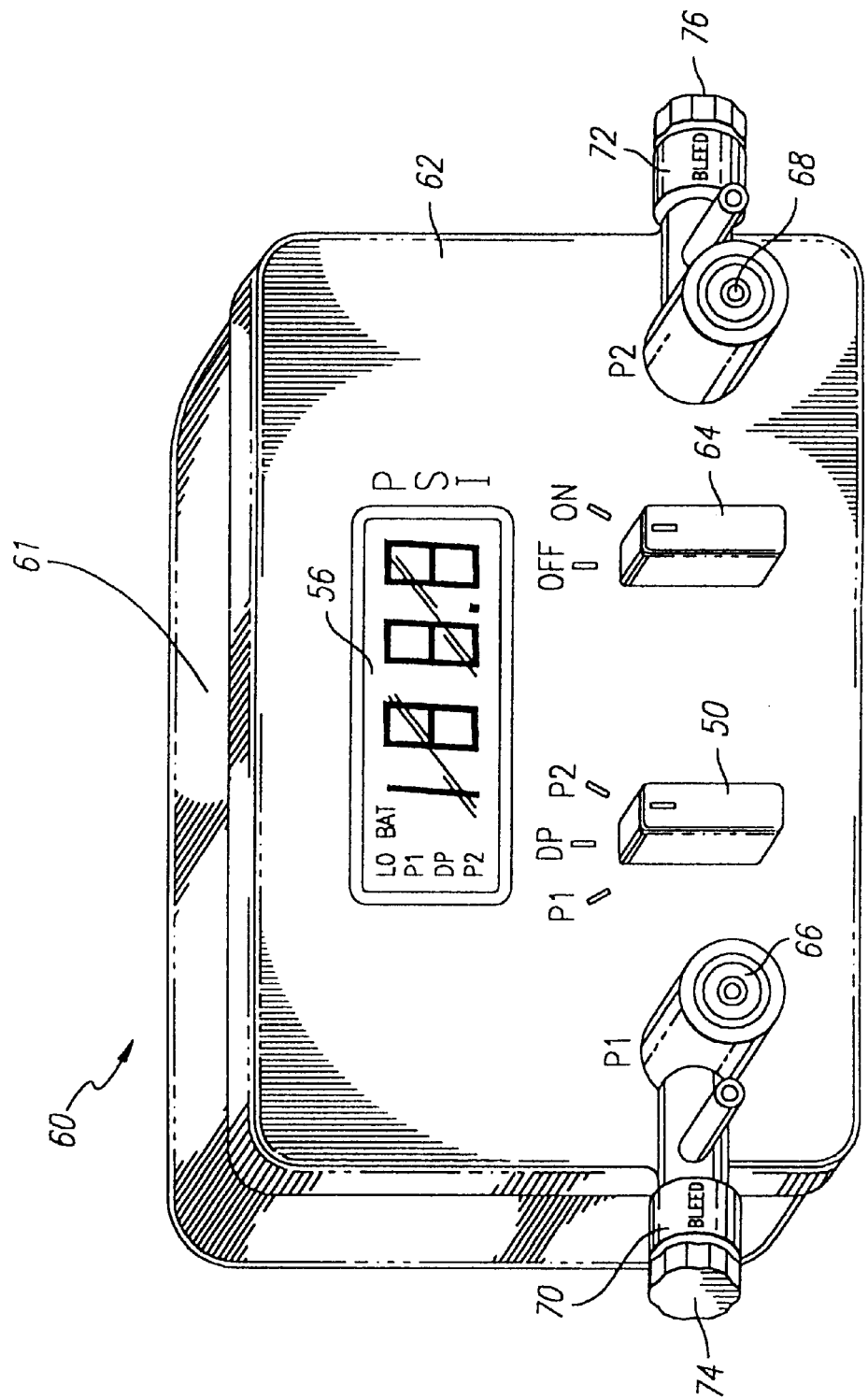
FIG. 5 is a perspective representation of the configuration of a solid state instrument suitable for the measurement of inlet pressure, outlet pressure, and differential pressure between the inlet and outlet of a component under test, in which each pressure is selectively shown on a liquid crystal display device, and which is constructed to incorporate the teachings of the invention.

The various components of the systems of FIGS. 3 and 4 may be housed in an appropriate casing 60 which is shown in FIG. 5. The liquid crystal display device 56 is mounted on a face plate 62 on one side of the casing 60 to be visible from the exterior of the casing. The rotary switch 50 is also mounted on the face plate 62, as is a typical ON/OFF switch 64. A fitting 66 is mounted on the casing for receiving the inlet liquid pressure applied to the component under test (P1), and a fitting 68 is also mounted on the casing for receiving the outlet pressure (P2). Appropriate tubing is provided for coupling the fittings 66 and 68 to the inlet and outlet of the component respectively. The fittings 66 and 68 may be equipped with appropriate bleed valves 70 and 72 which are controlled by manual knobs 74 and 76.

In the operation of the instrument of FIG. 5, the operator merely turns the switch 64 to the ON position, and sets the rotary switch 50 successively to its three positions to measure the inlet pressure ((P1) to the component under test, the outlet pressure (P2) and the differential pressure (DP), with each of the readings being displayed on the liquid crystal display device 56. No other operations are required by the operator to make the necessary measurements for each of the flow rates through the component under test.

Figure 6:
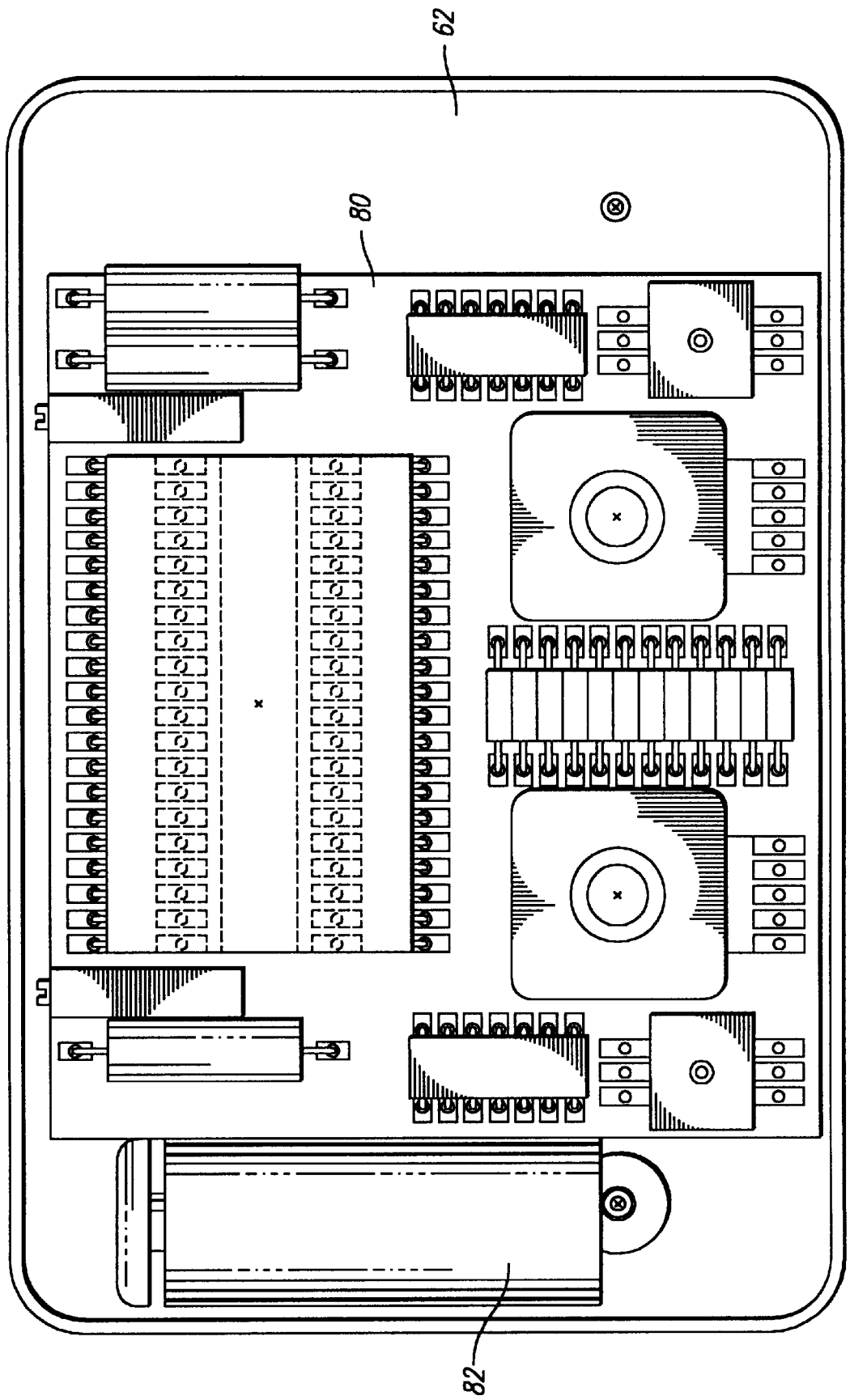
FIG. 6 is a rear view of the cover plate of the instrument of FIG. 5 showing the general location of the major components which are mounted on a printed circuit board attached to the back of the cover plate.

Face plate 62 of casing 60 of FIG. 5 may be a plastic molding. The liquid crystal display device 56 is mounted on the face plate, as mentioned above. A printed circuit board 80 (FIG. 6) is mounted on the underside of the face plate 62, with the electronic circuitry and electronic components of the instrument being mounted on the printed circuit board, as shown in FIG. 6. These electronic components include switches 50 and 64 (FIG. 5) which are preferably of the rotary type to facilitate sealing. The switches are manually adjustable from the exterior of the unit, as shown in FIG. 5. Switch 64 is is an ON/OFF rotary switch, and control switch 50 is a rotary switch having three positions designated P1, DP, P2, as also shown in FIGS. 3 and 4.

The bleed valves 70 and 72 are mounted on the ends of the face plate 62, as shown in FIG. 5. The bleed valves are respectively coupled to fitting 66 and 68. Fittings 66 and 68 include respective female fittings which in turn receive male fittings to allow connection to flexible tubing for coupling the instrument of the invention to the component under test, as shown in FIGS. 1 and 2. The bleed valves 70 and 72 are provided to bleed the line to remove any air from the flowing liquids. The face plate 62 is fitted to a rectangular can 61 at a sealed interface, and the can and face plate together form casing 60. The face plate 62 may be removed from can 61 so that an internal battery 82 which is mounted in a housing (FIG. 6) may be replaced, and so that any necessary zero or span adjustment calibrations may be made.

Figure 7:
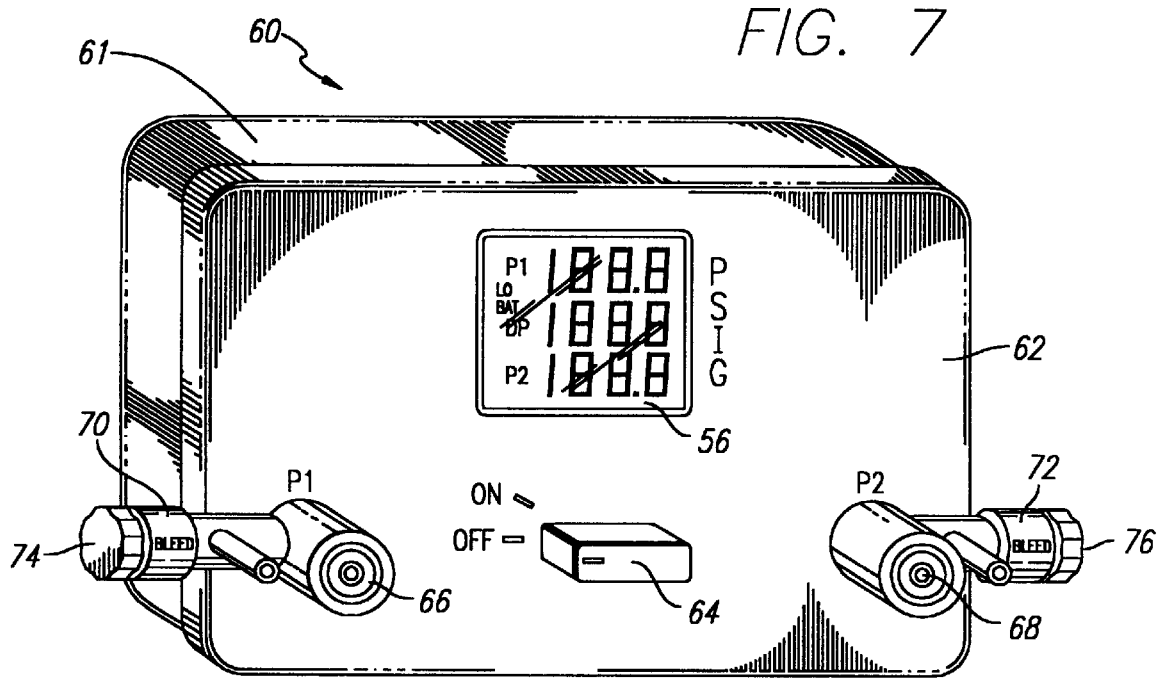
FIG. 7 is a perspective representation of an instrument similar to that of FIG. 5, but which is constructed so that all pressures are shown simultaneously on the liquid crystal display device.

In the embodiment of FIG. 5, the user selects either P1, P2 or the differential pressure DP for display by operating switch 50. The unit is illustrated in FIG. 5 as being calibrated in pounds per square inch (psi). However, any convenient units may be selected. The unit of FIG. 7 is similar to the unit of FIG. 5, and like elements have been designated by the same numbers. However, in the unit of FIG. 7 the switch 50 has been eliminated, and all pressures are displayed simultaneously on the display 56, as shown.

As stated above, FIG. 6 is a view of the underside of the cover plate 62 showing the circuit board 80 mounted to the underside of the cover plate, and also showing the location of various electronic components which are mounted on the circuit board.

Figure 8:
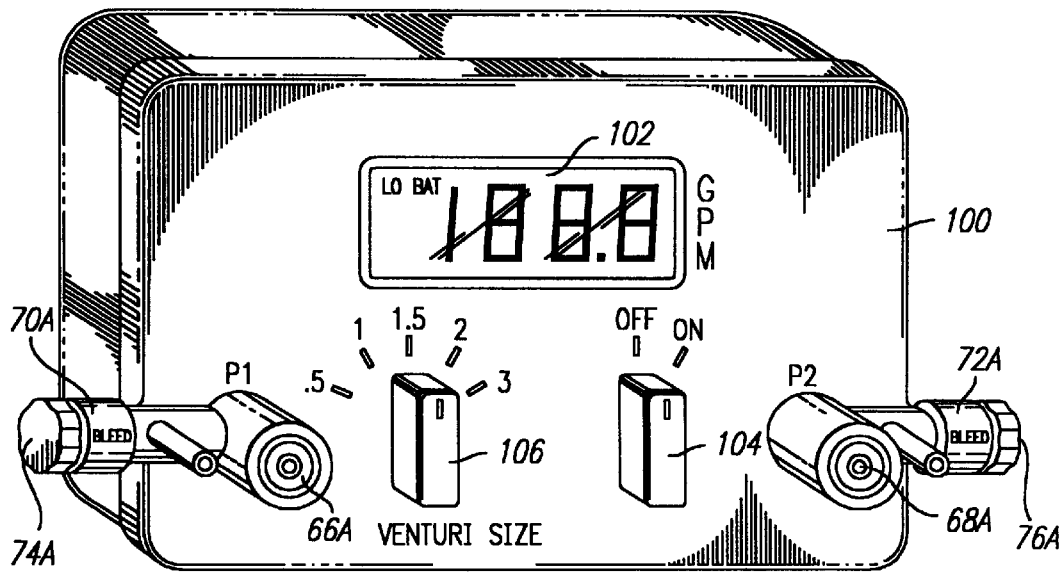
FIG. 8 is a perspective representation of a solid state instrument similar to the instruments of FIGS. 5 and 7, but which operates as an electronic flow meter.

The solid state electric flow meter shown in FIG. 8 may have a somewhat similar construction to the pressure gages of FIGS. 5 and 7. The flow meter includes a face plate 100 which, as before, may be a plastic molding. A liquid crystal display device 102 is mounted on the face plate, as shown, to be visible from the exterior of the meter. A printed circuit board (not shown) is mounted on the rear side of the face plate on which the electronic circuitry and components of the meter are mounted. These components include an ON/OFF switch 104, and a Venturi size selector switch 106. Both switches are manually adjustable from the exterior of the meter. The fittings 66A and 68A and associated bleed valves 70A, 72A are mounted on the ends of the face plate 100, as shown.

The unit of FIG. 8 is intended to be used in conjunction with a Venturi meter, since Venturi meters are preferred as a means for measuring flow rate. This is because there are no moving parts, the response time is extremely fast. In practice, a number of Venturi flow meters are manufactured in a variety of sizes to be selectively placed in the flow line, such as the flow meter 22 of FIGS. 1 and 2. Switch 106 may be adjusted to match the particular Venturi size of the selected flow meter. The corresponding flow rate is then displayed on liquid crystal display 102.

The major difference between the flow meter of FIG. 8 and the prior art electronic pressure gages is that the signal conditioning circuitry in the unit of FIG. 8 includes an algorithm to accommodate the pressure difference-flow rate squared relationship. Some correction for the velocity coefficient versus Reynolds number may also need to be addressed depending upon the accuracy desired.

Appropriate tubing is provided to couple fittings 66A and 68A of the unit of FIG. 8 to the inlet and outlet respectively of flow meter 22 of FIGS. 1 and 2. The fittings 66A and 68A are equipped with bleed valves 70A and 72A and manual control knobs 74A and 76A. The circuit in the unit of FIG. 8 may include means for capturing or holding the displays so that a simultaneous reading of all the data can be obtained at any instant in time and preserved until the data is transcribed. This obviates the problem of changing conditions during time required to transcribe the data. This means would also include a release to allow the unit to resume the display functions at the normal sampling rate.

Figure 9:
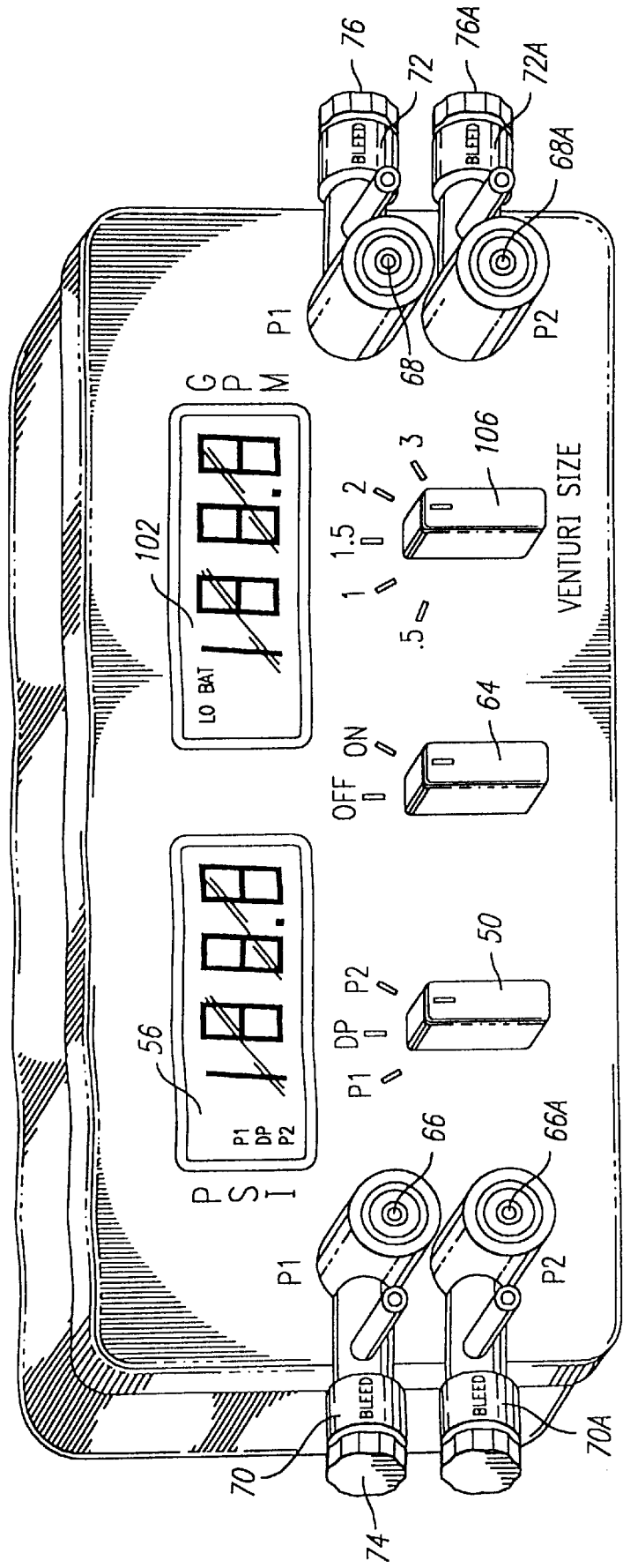
FIG. 9 is a perspective representation of a unit, similar to the units of FIGS. 5, 7 and 8, and which functions as a combination pressure gage and flow meter.

FIG. 9 shows a combined electronic pressure gage and flow meter. The unit of FIG. 9, combines, in one physical unit, the pressure gage 60 of FIG. 5 and the electronic flow meter of FIG. 8. The original numbers are preserved in the combined unit illustrated in FIG. 9.

The various units described above may include an electrical communications port for transmitting data to a computer or other data acquisition device. This port may take the form of "parallel data output," "serial data output," "4-20 ma output" or the like. Appropriate means may also be included to produce an audible and/or visual alarm when some predetermined pressure is exceeded.

Although the disclosure is directed to the measurement of liquid pressures and flows, with minor modifications gas measurements may also be made.

The invention provides, therefore, a convenient, economical and practical means for measuring pressures and flow rates.

It will be appreciated that while a particular embodiment of the invention has been shown and described, modifications may be made. It is intended in the claims to cover all modifications which come within the true spirit and scope of the invention.

I claim:

1. A solid state electronic gage responsive to the inlet pressure (P1) and the outlet pressure (P2) of a device undergoing a flow test to measure the pressure differential across the device at different flow rates, said pressure gage including:

a housing;

first and second pressure transducers mounted in the housing for generating electric signal outputs in response to inlet and outlet pressures applied thereto;

electronic circuitry including a signal difference determining circuit mounted in said housing connected to said transducers and responsive to the electric signal outputs therefrom for producing an output signal representative of the difference between the first and second inlet pressures applied to said transducers;

output means mounted on said housing;

further circuitry coupling the electronic circuitry to said output means for applying said output signal thereof;

and said electronic circuitry includes first and second analog-digital converters, and an electronic digital signal difference processor connected to the outputs of said converters.

2. The solid state electronic pressure gage defined in claim 1, in which said output means comprises a liquid crystal display device.

3. The solid state electronic pressure gage defined in claim 2, in which said electronic circuitry further includes a first amplifier for amplifying the output from said first transducer, a second amplifier for amplifying the output from said second transducer, and coupling means for introducing the three outputs from said difference signal determining circuit and said first and second amplifiers to said display device to be independently displayed by said display device.

4. The solid state electronic pressure gage defined in claim 3, in which said coupling means includes a switch for causing the three outputs to be sequentially displayed by the display device.

5. The solid state electronic pressure gage defined in claim 1, in which said electronic circuitry includes a differential amplifier.

6. The solid state electronic pressure gage defined in claim 3, in which the output signal of said differential amplifier is an analog signal, and in which said electronic circuitry includes an analog-to-digital converter for digitizing the analog output of said differential amplifier.

7. The solid state electronic pressure gage defined in claim 4, in which said output means comprises a liquid crystal display device, and in which said output circuitry includes driver circuitry connecting the analog-digital converter to the liquid crystal display.

8. The solid state electronic pressure gage defined in claim 7, in which said display device is calibrated in selected pressure units.

9. The solid state electronic pressure gage defined in claim 8, in which said display device is calibrated in selected flow rate units.

10. The solid state electronic pressure gage defined in claim 8, in which said further circuitry includes circuitry for conditioning the signals applied to said display device to accommodate for the squared relationship between the pressure difference and flow rate.

11. The solid state electronic pressure gage defined in claim 1, and which includes first and second fittings mounted on said housing respectively connected to said first and second transducers for removably receiving tubes connected to the inlet and outlet of the device under test to introduce the inlet pressure (P1) and the outlet pressure (P2) to the respective transducers.

12. The solid state electronic pressure gage defined in claim 1, in which said output means includes a flow meter, and the pressure gage measures the inlet pressure (P1) and the outlet pressure (P2) to determine the rate of flow of fluid through the flow meter.

* * * * *